（12）United States Patent
Trombley et al.

(10) Patent No.: US 9,988,046 B2
(45) Date of Patent: Jun. 5, 2018

(54) ENHANCED COLLISION AVOIDANCE

(71) Applicant: Ford Global Technologies, LLC, Dearborn, MI (US)

(72) Inventors: Roger Arnold Trombley, Ann Arbor, MI (US); Erick Michael Lavoie, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/219,493

(22) Filed: Jul. 26, 2016

(65) Prior Publication Data

US 2018/0029592 A1    Feb. 1, 2018

(51) Int. Cl.
*B60W 30/09* (2012.01)
*B60W 10/184* (2012.01)
*G08G 1/16* (2006.01)
*B60W 10/20* (2006.01)
*B60W 40/10* (2012.01)

(52) U.S. Cl.
CPC .......... *B60W 30/09* (2013.01); *B60W 10/184* (2013.01); *B60W 10/20* (2013.01); *B60W 40/10* (2013.01); *G08G 1/166* (2013.01); *G08G 1/167* (2013.01); *B60W 2540/18* (2013.01); *B60W 2710/18* (2013.01); *B60W 2710/20* (2013.01); *B60W 2750/30* (2013.01)

(58) Field of Classification Search
CPC .... B60W 30/09; B60W 10/184; B60W 10/20; B60W 2540/18; B60W 2710/18; B60W 2710/20; B60W 2750/30; G08G 1/166; G08G 1/167

USPC .......................................................... 701/41
See application file for complete search history.

(56) References Cited

U.S. PATENT DOCUMENTS

| 7,016,783 | B2 | 3/2006 | Hac et al. | |
| 7,607,741 | B2 | 10/2009 | Seto et al. | |
| 8,527,172 | B2 | 9/2013 | Moshchuk et al. | |
| 9,452,755 | B2* | 9/2016 | Kastner | B60W 10/04 |
| 9,701,307 | B1* | 7/2017 | Newman | B60W 30/09 |
| 9,711,050 | B2* | 7/2017 | Ansari | G08G 1/167 |
| 2005/0096827 | A1* | 5/2005 | Sadano | B60T 7/22 |
| | | | | 701/70 |

(Continued)

FOREIGN PATENT DOCUMENTS

| DE | 102011016770 A1 | 11/2011 |
| JP | 2003085698 A | 3/2003 |
| JP | 2011051570 A | 3/2011 |

OTHER PUBLICATIONS

Runarsson et al., "Collision avoidance at intersections", Chalmers University of Technology, Gothenburg, Sweden, Jun. 2014 (119 pages).

(Continued)

*Primary Examiner* — Atul Trivedi
(74) *Attorney, Agent, or Firm* — Frank A. MacKenzie; Bejin Bieneman PLC

(57) ABSTRACT

A driver input representing a steering maneuver associated with non-autonomous operation of a host vehicle is detected. A first target vehicle in an adjacent lane relative to the host vehicle is identified. The steering maneuver is allowed when a second target vehicle is detected in an original lane relative to the host vehicle. The steering maneuver is prevented when no second target vehicle is detected in the original lane of the host vehicle.

18 Claims, 4 Drawing Sheets

(56) References Cited

U.S. PATENT DOCUMENTS

| | | |
|---|---|---|
| 2011/0087433 A1 | 4/2011 | Yester |
| 2012/0053807 A1* | 3/2012 | Salinger .............. B60W 30/143 |
| | | 701/93 |
| 2012/0203435 A1 | 8/2012 | Braennstroem et al. |
| 2013/0030651 A1 | 1/2013 | Moshehuk et al. |
| 2013/0110349 A1* | 5/2013 | Tseng ................. B60W 50/087 |
| | | 701/36 |
| 2013/0338878 A1* | 12/2013 | Fritz .................... B60W 10/18 |
| | | 701/41 |
| 2014/0005875 A1* | 1/2014 | Hartmann ............. B60W 10/06 |
| | | 701/23 |
| 2014/0074330 A1* | 3/2014 | Malone ................ B60W 10/06 |
| | | 701/22 |
| 2014/0324297 A1 | 10/2014 | Kim |
| 2015/0367854 A1 | 12/2015 | Ezoe et al. |
| 2017/0203764 A1* | 7/2017 | Fujiki ............. B60W 30/18163 |
| 2017/0305349 A1* | 10/2017 | Naboulsi .................. B60R 1/04 |

OTHER PUBLICATIONS

Search Report dated Jan. 25, 2018 from United Kingdom Intellectual Property Office regarding GB Application No. 1711770.6 (3 pages).

* cited by examiner

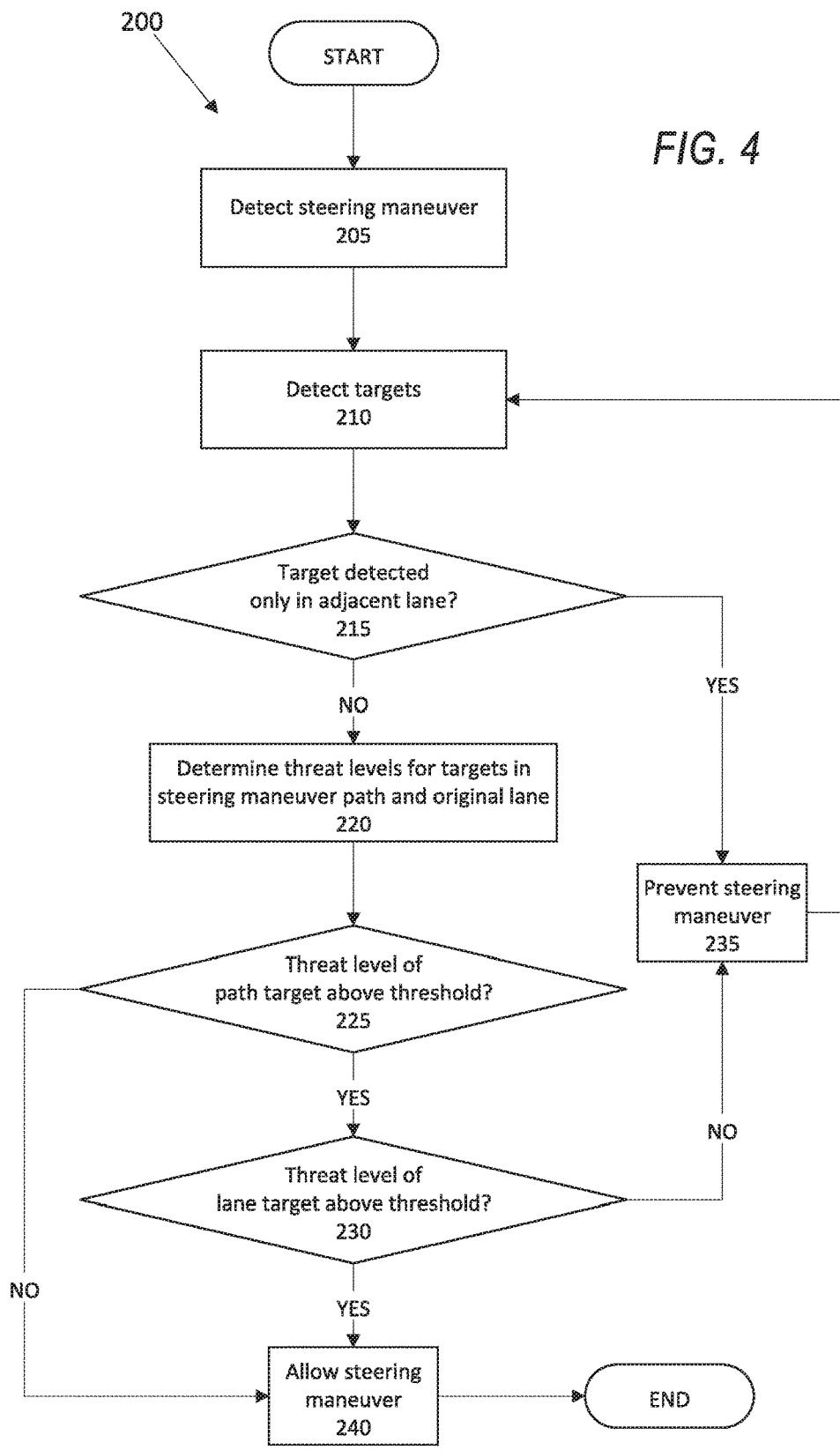

ENHANCED COLLISION AVOIDANCE

BACKGROUND

Collision avoidance systems use sensors to detect a target vehicle on a collision course with a host vehicle. The systems can detect the target object position and speed to determine a probability of a collision with the host vehicle. Collision avoidance systems apply a brake to prevent the host vehicle from performing a steering maneuver across an adjacent roadway lane with the oncoming target vehicle in the adjacent roadway lane.

BRIEF DESCRIPTION OF THE DRAWINGS

FIG. 4 illustrates a flow chart of an example process for selectively allowing the steering maneuver for the host vehicle.

DETAILED DESCRIPTION

Present collision avoidance systems do not account for more than one target vehicle approaching the host vehicle or when the host vehicle is in the collision path of a target vehicle as a result of trying to avoid an object (e.g., a vehicle traveling in the wrong direction, an object or animal in the roadway, a vehicle stopped in the roadway, etc.) in the lane of the host vehicle. Thus, present current collision avoidance systems may prevent steering maneuvers in these situations even though allowing the steering maneuver may be a better course of action.

One solution includes a collision avoidance system that accounts for multiple vehicles or objects and makes a decision about whether to permit the steering maneuver under various circumstances. Specifically, the system detects a driver input representing a steering maneuver performed during non-autonomous operation of a host vehicle and, when the system identifies a first target vehicle in an adjacent lane relative to the host vehicle, the system will allow the steering maneuver if a second target vehicle is detected in an original lane relative to the host vehicle and prevent the steering maneuver if no second target vehicle is detected in the original lane of the host vehicle.

Accordingly, the system prevents the host vehicle from performing the steering maneuver, e.g., a left-hand turn, when the first target vehicle has a threat level beyond a threat level threshold and the second target vehicle is either not present or has a threat level below the threat level threshold, i.e., only the first target vehicle has a probability of colliding with the host vehicle that the system determines is high enough to warrant preventing the steering maneuver. That is, the system prevents the steering maneuver even though a host vehicle driver intends to move the host vehicle when the first target vehicle could collide with the host vehicle. If the first target vehicle has a threat level below the threat level threshold, or if both target vehicles have threat levels above the threat level threshold, the system allows the driver to perform the steering maneuver.

By accounting for both target vehicles, the collision avoidance system can selectively determine whether to prevent the steering maneuver or to allow the steering maneuver intended by the driver. Using the threat levels, the collision avoidance system determines whether it is better to allow the driver to perform the steering maneuver or to prevent the steering maneuver until one of the target vehicles passes the host vehicle.

Figure 1:
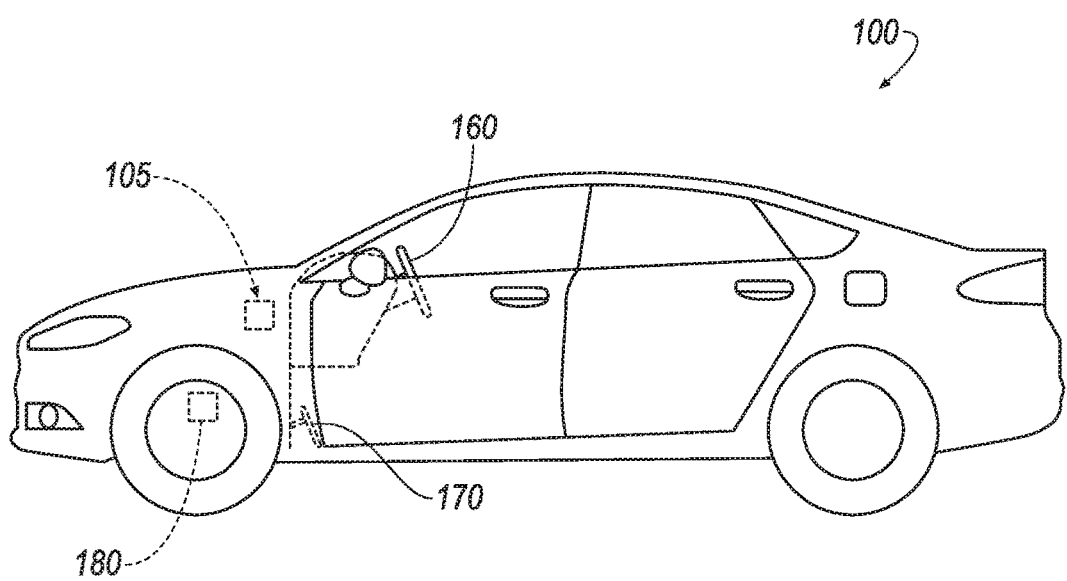
FIG. 1 illustrates an example host vehicle including a collision avoidance system.

FIG. 1 illustrates a host vehicle 100 including a collision avoidance system 105. The collision avoidance system 105 detects whether the host vehicle 100 is about to perform a steering maneuver from a roadway lane across a second roadway lane (i.e., a roadway lane for oncoming traffic). Based on the steering maneuver, the collision avoidance system 105 determines a probability of a collision with a target vehicle during the steering maneuver. Although shown as a car, the host vehicle 100 may be any vehicle capable of performing the steering maneuver. Thus, the host vehicle 100 may include any passenger or commercial automobile such as a car, a truck, a sport utility vehicle, a crossover vehicle, a van, a minivan, a taxi, a bus, etc. In some possible approaches, as discussed below, the vehicle is an autonomous vehicle that can operate in an autonomous (e.g., driverless) mode, a partially autonomous mode, and/or a non-autonomous mode.

The host vehicle 100 includes a steering wheel 160, an accelerator pedal 170, and a brake 180. The steering wheel 160 operates a powertrain to steer the host vehicle 100. The driver uses the steering wheel 160 to turn the host vehicle 100, e.g., in a steering maneuver. The accelerator pedal 170 actuates a propulsion subsystem, e.g., a throttle, an electric motor, etc., to move the host vehicle 100. The driver uses the accelerator pedal 170 to provide propulsion to the host vehicle 100. The brake 180 slows and stops the host vehicle 100 by, e.g., providing friction on a vehicle 100 wheel. The driver uses the brake 180 to slow and stop the host vehicle 100.

Figure 2:
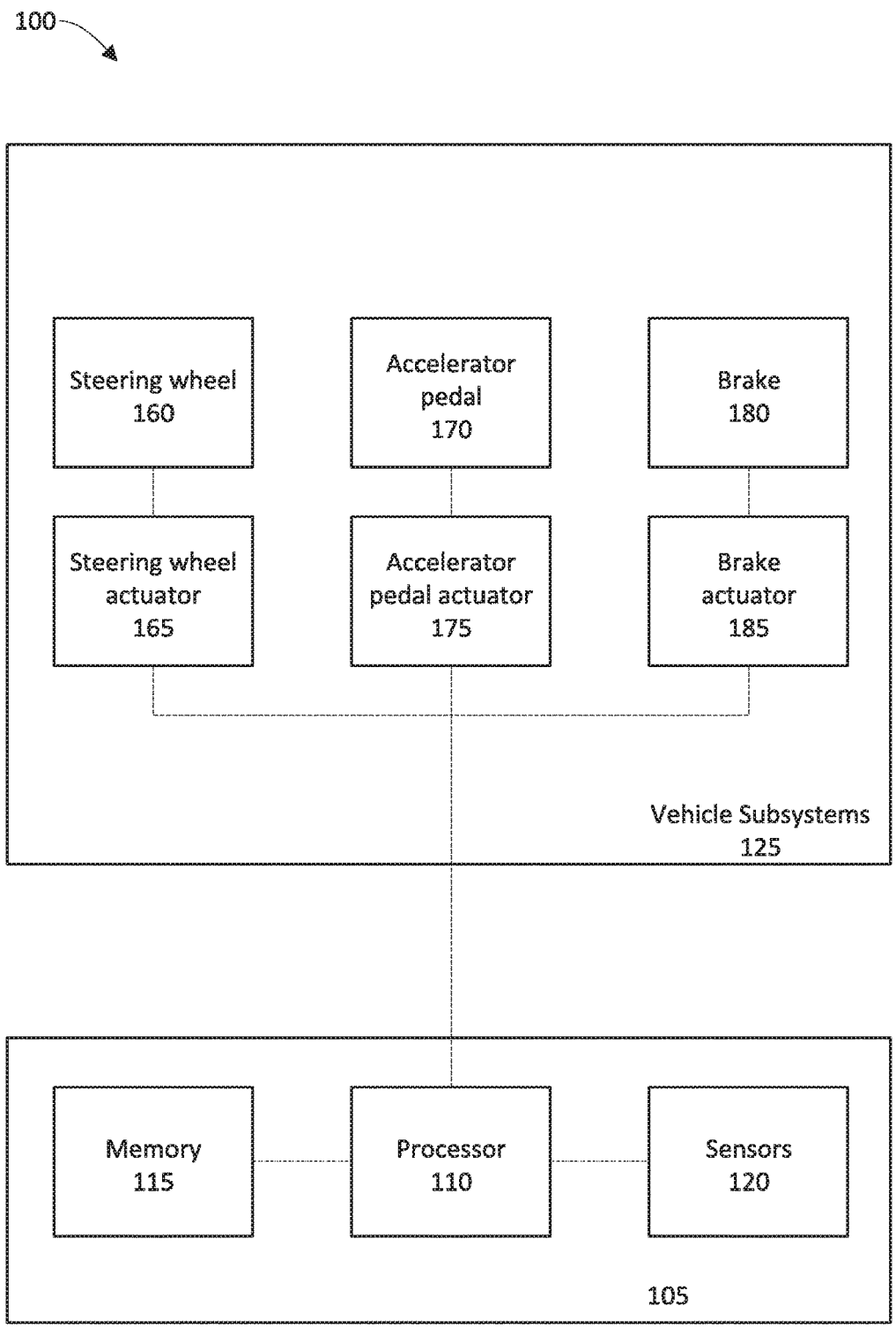
FIG. 2 is a block diagram of the host vehicle of FIG. 1 including the collision avoidance system.

FIG. 2 is a block diagram showing example components of the host vehicle 100 including components of the collision avoidance system 105. The collision avoidance system 105 includes a processor 110, a memory 115, and at least one sensor 120.

Sensors 120, which are implemented via circuits, chips, or other electronic components, include a variety of devices, e.g., a steering wheel angle sensor, a pedal position sensor, etc. The sensors 120 can output data to the processor 110 via the vehicle 100 network or bus, e.g., data relating to vehicle speed, acceleration, position, system and/or component status, etc. Alternatively, the sensors 120 can output data to a controller. Other sensors 120 could include cameras, motion detectors, etc., i.e., sensors to provide data for evaluating location of the target vehicle, projecting a path of the target vehicle, etc. The processor 110 can instruct the sensors 120 to collect data on specific objects, e.g., the target vehicles.

The processor 110 is implemented via circuits, chips, or other electronic component that can receive the data from the sensors 120 and determine, from the data, whether the host vehicle 100 is performing a steering maneuver. The processor 110 may be programmed to process the sensor 120 data. Processing the data may include processing the video feed or other data stream captured by the sensors 120 to determine where the steering maneuver and the presence of any target vehicles. As described below and shown in FIG. 2, the processor 110 instructs vehicle components to actuate.

Furthermore, the processor 110 estimates the threat level of the target vehicles and determines whether to allow or to prevent the steering maneuver based on the estimated threat levels. That is, the processor 110 uses data from the sensors 120 to determine the position, speed, and trajectory of the target vehicles to predict a path that each of the target vehicles will follow. Based on the predicted paths of the target vehicles and the path that the steering maneuver will cause the host vehicle to follow, the processor 110 determines the probability of a collision between the host vehicle 100 and each of the target vehicles. Based on the probabilities, the processor 110 estimates the threat level for each target vehicle. Based on the threat levels, the processor 110 determines whether to allow the steering maneuver or to prevent the steering maneuver.

The processor 110 communicates with at least one vehicle subsystem 125. The vehicle subsystems 125 control components of the host vehicle 100. The processor 110 instructs the vehicle subsystems 125 to actuate the components to adjust operation of the host vehicle 100. The vehicle subsystems 125 include, e.g., a steering subsystem, a brake subsystem, a navigation subsystem, a powertrain, etc.

The processor 110 may actuate the subsystems 125 to control the host vehicle 100 components, e.g., to move the host vehicle 100 to a stop, to avoid targets, etc. For example, as shown in FIG. 2, a steering subsystem includes the steering wheel 160 and a steering wheel actuator 165. The processor 110 can actuate the steering wheel actuator 165 to move the steering wheel 160 to a steering angle. Thus, the processor 110 can control the steering of the host vehicle 100 with the steering subsystem. For example, the processor 110 may detect a driver input indicating a direction of rotation of a steering wheel 160 toward the adjacent lane and actuate the steering wheel 160 in a direction opposite the direction of rotation of the driver input to keep the host vehicle 100 in the original lane. An accelerator subsystem includes the accelerator pedal 170 and an accelerator pedal actuator 175. The processor 110 can actuate the accelerator pedal actuator 175 to move the accelerator pedal 170 to an accelerator pedal angle, which actuates the vehicle 100 propulsion. That is, the processor 110 can control the propulsion of the host vehicle 100 with the accelerator subsystem. A brake subsystem includes the brake 180 and a brake actuator 185. The processor 110 can actuate the brake actuator 185 to actuate the brake 180 to slow or stop the host vehicle 100. That is, the processor 110 can control the braking of the host vehicle 100 with the brake subsystem. Furthermore, the processor 110 may actuate the brake subsystem according to the time necessary to prevent the steering maneuver. For example, the processor 110 may determine that, to prevent the vehicle 100 from colliding with a target while maintaining the position of the vehicle 100 to complete the steering maneuver, the processor 110 may instruct the brake actuator 185 to abruptly actuate the brake 180. That is, the processor 110 may instruct the brake actuator 185 to apply the brake 180 to a specific brake angle according to how abruptly the processor 110 determines to prevent the steering maneuver. The processor 110 may output signals to control any number of vehicle subsystems 125, including the steering subsystem, the accelerator subsystem, and the brake subsystem, to prevent the steering maneuver.

The processor 110 may be programmed to actuate various vehicle subsystems 125 according to the number of target vehicles detected, the locations of the target vehicles relative to the host vehicle, and the threat level of the target vehicles detected. For example, if the processor 110 detects one target vehicle based on the data from the sensor 120, and the target vehicle is in an adjacent lane to the host vehicle 100, the processor 110 may be programmed to actuate one or more of the vehicle subsystems 125 to prevent the steering maneuver until the target vehicle passes the host vehicle 100. When the processor 110 detects two target vehicles, one in the adjacent lane of the host vehicle 100 and one in the original lane of the host vehicle 100, the processor 110 may be programmed to selectively prevent the steering maneuver based on the threat levels of the target vehicles. If the processor 110 determines that the threat level for the target vehicle in the adjacent lane is below a threat level threshold or the threat level for the target vehicle in the original lane is above the threat level threshold, the processor 110 may be programmed to allow the driver to execute the steering maneuver. If the processor 110 determines that the threat level of the target vehicle in the adjacent lane is above the threat level threshold and that the threat level of the target in the original lane is below the threat level threshold, then the processor 110 may be programmed to prevent the steering maneuver by outputting various signals to the vehicle subsystems 125 prevent the driver of the host vehicle from executing the steering maneuver.

The processor 110 may be programmed to recognize certain driver inputs as indicating a driver's desire to override the decision by the processor to prevent the steering maneuver and allow the steering maneuver upon recognizing the driver input requesting the override. That is, certain driver inputs indicate to the processor 110 that the driver wishes to proceed with the steering maneuver even though the processor 110 would otherwise prevent the steering maneuver by, e.g., actuating one or more subsystems 125 to prevent the steering maneuver. For example, if an accelerator pedal sensor 120 indicates that the accelerator pedal 170 is depressed by the driver for a predetermined period of time, the processor 110 may be programmed to allow the steering maneuver and accept the driver input to the accelerator subsystem 125. The processor 110 may be programmed to transition between a non-autonomous mode, a partially autonomous mode, and a fully autonomous mode for the vehicle subsystems 125. The processor 110 may be programmed to transition between the modes according to a ramp function, e.g., linearly increasing the amount of human operator control when transitioning from a fully autonomous mode to a non-autonomous mode. In the non-autonomous mode, the processor 110 may still provide input to the vehicle subsystems 125, e.g., with power steering for the steering subsystem, automatic throttle adjustment for the acceleration subsystem, anti-lock braking for the brake subsystem, etc.

Figure 3:
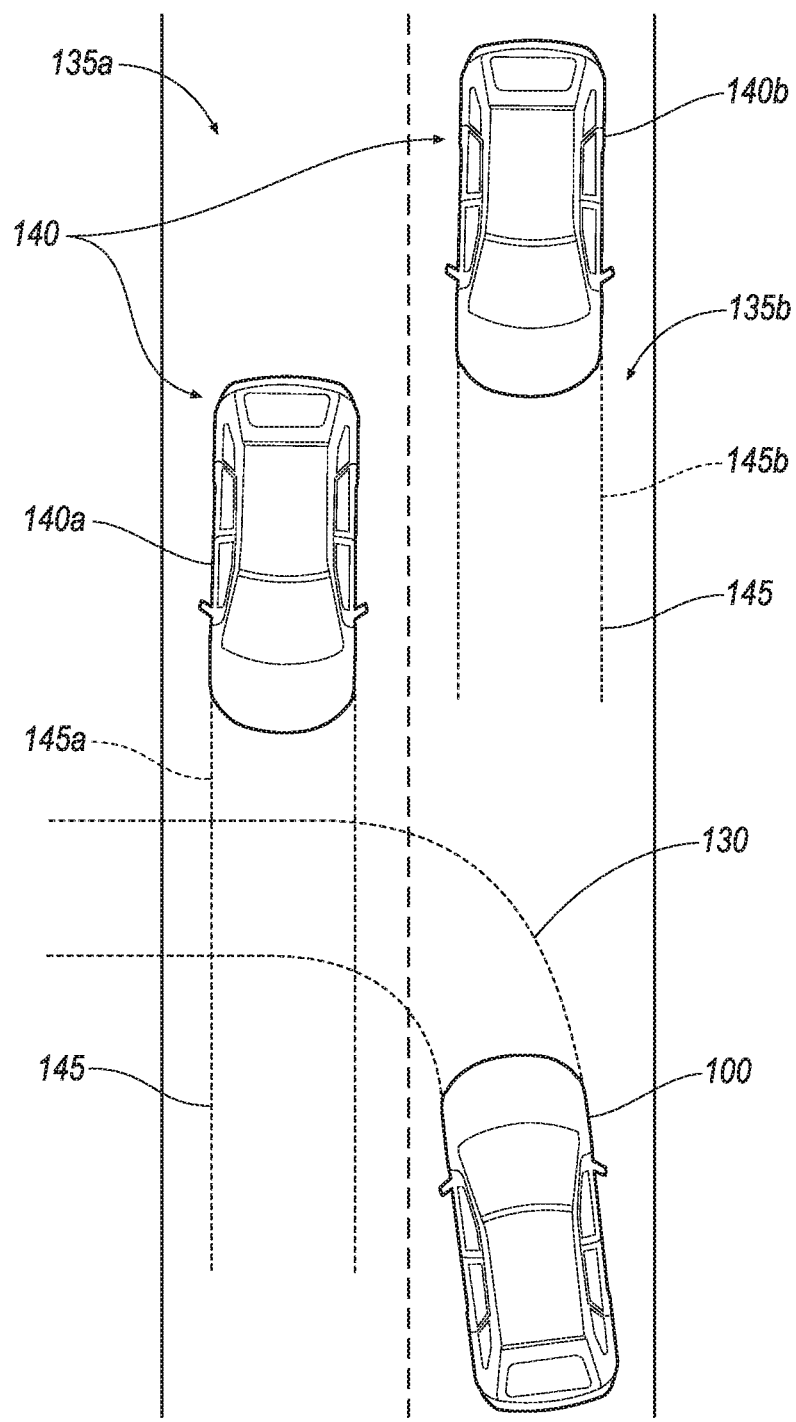
FIG. 3 is a view of the example host vehicle of FIG. 1 performing a steering maneuver.

FIG. 3 illustrates the host vehicle 100 performing a steering maneuver 130, shown as a left-hand turn from an original lane 135*b* of the host vehicle 100 across an adjacent lane 135*a*, while the host vehicle 100 is operating in a non-autonomous mode of operation. As the host vehicle 100 moves along a roadway lane 135 and approaches the location of the turn, the driver starts to perform the steering maneuver by providing a driver input to one or more of the vehicle subsystems 125, such as the steering wheel 160, the accelerator pedal 170, or both, to turn the host vehicle 100 across a lane of traffic. During the steering maneuver, and possibly before the steering maneuver begins, the sensors 120 collect data on the vehicle subsystems 125, e.g., the steering angle, the transmission state, the throttle angle, etc., and output the collected data to the processor 110. Based on the vehicle subsystem 125 data, the processor 110 detects that the driver intends to perform the steering maneuver 130.

The processor 110 can further determine whether target vehicles 140 are present in the lanes 135 during the steering maneuver 130 based on the data collected by the sensors 120. For instance, the sensors 120 may collect data representing the presence and position of the target vehicles 140. As used herein, a "position" of the target vehicle 140 and/or the host vehicle 100 may refer to a location specified with reference to coordinates in a coordinate system, e.g., geo-coordinates, a set of coordinates on a predetermined X-Y-Z Cartesian grid, etc. Alternatively, the position of the target vehicles 140 may be defined relative to the position of the host vehicle 100.

A first target vehicle 140a and a second target vehicle 140b are shown in FIG. 3. The sensors 120 detect the target vehicles 140a, 140b and output signals representing the detected target vehicles 140 to the processor 110. From the signals output by the sensors 120, the processor 110 determines the position, direction, and speed of each of the target vehicles 140a, 140b. In the example shown in FIG. 3, the first target vehicle 140a is traveling in the adjacent roadway lane 135a toward the host vehicle 100. Because the steering maneuver would put the host vehicle in the path of the first target vehicle 140a, the first target vehicle 140a may be referred to as a "path target" 140 relative to the host vehicle 100. Because the second target vehicle 140b is traveling in the original lane 135b of the host vehicle 100, the second target vehicle 140b may be referred to as a "lane target" 140.

The collision avoidance system 105 predicts a path 145 for each target vehicle 140. That is, the sensors 120 collect data about the target vehicles 140 and the processor 110 is programmed to predict the path 145 that each target vehicle 140 will follow based on the collected data. The path 145 is a predicted line of travel that the target vehicle 140 will follow based on one or more elements of the target trajectory, e.g., the target vehicle 140 speed, the target vehicle 140 direction of travel, the target vehicle 140 position, etc. For purposes of clarity and simplicity, the path 145 is represented as a strip having two edges separated by a distance that is the width of the target vehicle 140, e.g., 2 meters, extending in a direction the target vehicle 140 is predicted to travel. In the example of FIG. 3, the collision avoidance system 105 determines a target path 145 for each target vehicle 140, i.e., a target path 145a for the target vehicle 140a and a target path 145b for the target vehicle 140b. The target paths 145a, 145b of the target vehicles 140a, 140b show that the target vehicle 140b is in the original lane 135b of the host vehicle 100 and that the target vehicle 140a is in an adjacent lane 135a and is moving into the path of the steering maneuver 130.

The collision avoidance system 105 determines threat levels for each of the target vehicles 140 based on the paths 145 and the steering maneuver 130. That is, the processor 110 is programmed to use the data collected by the sensors 120 and the previously determined paths 145 and the steering maneuver 130 to determine a threat level for each target vehicle 140. The threat level for a target vehicle 140 indicates a probability of a collision between the target vehicle 140 and the host vehicle 100. The processor 110 may consider a host vehicle 100 position, speed, direction of travel, ability to steer, a target vehicle 140 position, speed, direction of travel, ability to steer, etc., in developing the threat level for each target vehicle 140. With the threat level, the processor 110 may be programmed to determine how likely it is that the target vehicle 140 and the host vehicle 100 will collide during the steering maneuver, and whether either of the target vehicle 140 and the host vehicle 100 can avoid the collision.

The threat level may be represented as a value between 0 and 1, with numbers closer to 1 indicating a higher probability of a collision. For example, the threat level may be a ratio of a required deceleration to stop the target vehicle 140 prior to reaching the path defined by the steering maneuver 130 (i.e., a "zero-range" deceleration) to a predetermined maximum deceleration of the target 140. Thus, if the first target vehicle 140a has a zero-range deceleration higher than that of the second target vehicle 140b the threat level of the first target vehicle 140a would be higher than the threat level of the second target vehicle 140b. The collision avoidance system 105, and specifically the processor 110, would thus determine that the first target vehicle 140a has a higher probability of colliding with the host vehicle 100 than the second target vehicle 140b would. Alternatively, if the target vehicle 140b in the original lane 135b is stationary, the processor 110 can determine the threat level based on the host vehicle 100 zero-range deceleration relative to that target vehicle 140b. That is, the processor 110 may be programmed to consider data from the sensors 120 of the host vehicle 100 speed to determine the required deceleration to stop the host vehicle 100 prior to reaching the stationary target vehicle 140b. The processor 110 uses the zero-range deceleration of the host vehicle 100 to the stationary target vehicle 140b to determine the threat level for the target vehicle 140b. A similar approach may apply if the target vehicle 140b is moving in the same direction as the host vehicle 100, especially if the target vehicle 140b is moving much more slowly than the host vehicle 100. Accordingly, the collision avoidance system 105 uses the threat levels to determine specific adjustments to vehicle subsystems 125 in the host vehicle 100 to avoid the target vehicles 140 with threat levels above a threat level threshold to avoid collisions.

The collision avoidance system 105, and specifically the processor 110, is programmed to actuate the vehicle subsystems 125 to selectively allow or prevent the steering maneuver 130 based on the threat levels of the target vehicles 140. The first target vehicle 140a travels in the lane 135 adjacent to the original lane 135 that the host vehicle 100 travels, i.e., the first target vehicle 140a is a path target 140. The second target vehicle 140b travels in the original lane 135 of the host vehicle 100, i.e., the second target vehicle 140b is a lane target 140. Both target vehicles 140a, 140b move in a direction toward the host vehicle 100. If the threat level of the first target vehicle 140a is above the threat level threshold, and the second target vehicle 140b is either not present or has a threat level below the threat level threshold, the collision avoidance system 105 actuates the vehicle subsystems 125 to prevent the steering maneuver 130 until the first target vehicle 140a passes the host vehicle 100.

To prevent the steering maneuver, the processor 110 may command the brake subsystem to apply a brake 180 until the first target vehicle 140a passes the host vehicle 100, at which point the processor 110 instructs the brake subsystem to release the brake 180. In addition or in the alternative, the processor 110 can detect the driver input rotating the steering wheel 160 based on the steering angle from the sensor 120 acting as a steering wheel angle sensor indicating that the host vehicle 100 will steer into the adjacent lane 135 and actuate the steering wheel actuator 165 to rotate the steering wheel 160 in a direction opposite the direction of rotation of the steering wheel driver input to keep the host vehicle 100 in the original lane 135. Preventing the steering maneuver may further or alternatively include the processor 110 commanding the powertrain subsystem to limit the powertrain output, which will slow or stop the host vehicle 100. If the threat levels for both of the target vehicles 140a, 140b are above the threat level threshold, the collision avoidance system 105, and specifically the processor 110, allows the steering maneuver 130.

The driver may override the collision avoidance system 105, as described above. For example, if the driver sees that the target vehicle 140*a* is going to turn away from the host vehicle 100, something that the collision avoidance system 105 may not be able to detect, the driver may want to perform the steering maneuver 130. The driver may override the collision avoidance system 105 to perform the steering maneuver 130 by depressing the accelerator pedal 170. When an accelerator pedal position angle exceeds a pedal position angle threshold for a predetermined period of time, the processor 110 may release the brake 180 by actuating the brake actuator 185, allowing the driver to perform the steering maneuver 130.

FIG. 4 illustrates a process 200 for determining whether to allow or prevent the steering maneuver 130 for the host vehicle 100 equipped with the collision avoidance system 105. The process 200 may be initiated any time the host vehicle 100 is operating and may continue to execute until, e.g., the host vehicle 100 is shut off.

At block 205, the processor 110 detects the steering maneuver 130 of the host vehicle 100. The processor 110 instructs the sensors 120 collect data on the vehicle subsystems 125, e.g., the steering angle, the transmission state, the throttle angle, etc. Based on the vehicle subsystem 125 data, the processor 110 determines that the driver intends to perform the steering maneuver 130.

At block 210, the processor 110 instructs the sensors 120 collect data on any nearby target vehicles 140. For instance, the processor 110 may instruct the sensors 120 to identify target vehicles 140 in the lanes 135. Based on the data received from the sensors, the processor 110 determines how many targets 140 are present in the lanes 135, if any, and the locations of the target vehicles 140. For example, the processor 110 may determine that there are two target vehicles 140, as in the example of FIG. 3. In another example, the processor 110 may determine that only one of the path target 140 and the lane target 140 is present, e.g., the path target 140 has passed the host vehicle 100. As described above, the processor 110 may identify the target vehicle 140 in a lane 135 adjacent to the host vehicle 100 as a path target 140, and the processor 110 may identify the target 140 in an original lane 135 of the host vehicle 100 as a lane target. In yet another example, the processor 110 may detect no target vehicles 140.

At decision block 215, the processor 110 determines whether only one target 140 is detected and whether the detected target vehicle 140 is in an adjacent lane 135 through which the steering maneuver 130 will turn the host vehicle 100. That is, the processor 110 determines whether the only detected target 140 is a target 140 that could collide with the host vehicle 100 during the steering maneuver. If the processor 110 determines that the target vehicle 140 is only in the adjacent lane 135, the process 200 proceeds to bock 235. Otherwise, the process 200 proceeds to block 220.

At block 220, the processor 110 determines threat levels for each detected target vehicle 140, if present. As described above, each respective threat level represents a probability of a collision between the target vehicle 140 and the host vehicle 100. The threat level may be represented as a value between 0 and 1, with numbers closer to 1 indicating a higher probability of a collision. For example, the threat level may be a ratio of a required deceleration to stop the target vehicle 140 prior to reaching the path defined by the steering maneuver 130 (i.e., a "zero-range" deceleration) to a predetermined maximum deceleration of the target 140. Alternatively, in some situations, the threat level may be represented as a ratio of the required deceleration to stop the host vehicle 100 prior to reaching one of the target vehicles 140. If the processor 110 detects no target vehicle 140, the threat level is 0.

At decision block 225, the processor 110 determines whether the threat level of the target vehicle 140 in the adjacent lane 135, i.e., the path target 140, is above the threat level threshold. As described above, if the processor 110 detects no path targets 140, the threat level is 0. If the threat level of the path target 140 is above the threat level threshold, the process 200 continues at block 230. If the threat level of the path target 140 is below the threat level threshold or the processor 110 detects no path target 140, the process 200 proceeds to block 240.

At decision block 230, the processor 110 determines whether the threat level of the target vehicle 140 in the original lane 135 of the host vehicle, i.e., the lane target 140, is above the threat level threshold. If the processor 110 detects no lane targets 140, the threat level is 0. If the threat level of the lane target 140 is above the threat level threshold, the process 200 continues at block 235. If the threat level of the lane target 140 is below the threat level threshold or the processor 110 detects no lane target 140, the process 200 continues at block 240.

In the block 235, the processor 110 instructs the vehicle subsystems 125 to prevent the steering maneuver 130. Because the threat level for the path target 140 is above the threat level threshold and the threat level of the lane target 140 is below the threat level threshold, the processor 110 determines that the host vehicle 100 should not perform the steering maneuver 130 until the path target 140 passes the host vehicle 100. The processor 110 actuates vehicle subsystems 125 to prevent the steering maneuver 130. For example, the processor 110 may detect a driver input indicating a direction of rotation of a steering wheel 160 toward the adjacent lane 135 and actuate the steering wheel 160 in a direction opposite the direction of rotation of the driver input and/or actuate the brake subsystem 125 to stop the host vehicle 100. The process 200 then returns to block 210 to detect new target vehicles 140 and/or that current target vehicles 140 have passed the host vehicle 100.

At block 240, the processor 110 allows the vehicle subsystems 125 to perform the steering maneuver 130. Allowing the steering maneuver may include the processor 110 not taking any action that would prevent the driver inputs executing the steering maneuver. The process 200 may end after block 240.

With the process 200, the driver is permitted to perform steering maneuvers when the threat level for the lane target 140 is above the threat level threshold and/or the threat level for the path target 140 is below the threat level threshold, the processor 110 should allow the driver to perform the steering maneuver 130. The process 200 further allows the steering maneuver when no path targets 140 were detected. The process 200 prevents the steering maneuver when the threat level for the path target 140 is above the threat level threshold and the threat level of the lane target 140 is below the threat level threshold, at least until the path target 140 passes the host vehicle 100.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims. It is intended that future developments will occur in the technologies discussed herein, and that the disclosed systems and methods will be incorporated into such future embodiments. In sum, it should be understood that the application is capable of modification and variation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising a computer including a processor and a memory storing instructions executable by the processor, the instructions including:
   detecting a driver input representing a steering maneuver associated with non-autonomous operation of a host vehicle;
   identifying a first target vehicle in an adjacent lane relative to the host vehicle;
   determine a threat level associated with the first target vehicle based on a predicted path of the first target vehicle; and
   allowing the steering maneuver when a second target vehicle is detected in an original lane relative to the host vehicle and preventing the steering maneuver when no second target vehicle is detected in the original lane of the host vehicle and the threat level exceeds a predetermined threshold.

2. The system of claim 1, wherein the instructions further include actuating a brake to prevent the steering maneuver.

3. The system of claim 2, wherein the instructions further include releasing the brake when an accelerator pedal position angle exceeds a pedal position angle threshold for a predetermined period of time.

4. The system of claim 2, wherein the instructions further include releasing the brake after the first target vehicle passes the host vehicle.

5. The system of claim 1, wherein detecting the driver input includes detecting a direction of rotation of a steering wheel toward the adjacent lane and wherein preventing the steering maneuver includes actuating the steering wheel in a direction opposite the direction of rotation of the driver input.

6. The system of claim 1, wherein the instructions further include allowing the steering maneuver after the first target vehicle passes the host vehicle.

7. The system of claim 6, wherein allowing the steering maneuver includes releasing a brake.

8. The system of claim 1, wherein detecting the driver input includes detecting a direction of rotation of a steering wheel toward the adjacent lane and wherein preventing the steering maneuver includes actuating the steering wheel in a direction opposite the direction of rotation of the driver input.

9. The system of claim 1, wherein preventing the steering maneuver includes limiting a powertrain output to prevent the steering maneuver.

10. A method, comprising:
detecting a driver input representing a steering maneuver associated with non-autonomous operation of a host vehicle;
identifying a first target vehicle in an adjacent lane relative to the host vehicle;
determining a threat level associated with the first target vehicle based on a predicted path of the first target vehicle; and
allowing the steering maneuver when a second target vehicle is detected in an original lane relative to the host vehicle and preventing the steering maneuver when no second target vehicle is detected in the original lane of the host vehicle and the threat level exceeds a predetermined threshold.

11. The method of claim 10, further comprising actuating a brake to prevent the steering maneuver.

12. The method of claim 11, further comprising releasing the brake when an accelerator pedal position angle exceeds a pedal position angle threshold for a predetermined period of time.

13. The method of claim 11, further comprising releasing the brake after the first target vehicle passes the host vehicle.

14. The method of claim 10, wherein detecting the driver input includes detecting a direction of rotation of a steering wheel toward the adjacent lane and wherein preventing the steering maneuver includes actuating the steering wheel in a direction opposite the direction of rotation of the driver input.

15. The method of claim 10, further comprising allowing the steering maneuver after the first target vehicle passes the host vehicle.

16. The method of claim 15, wherein allowing the steering maneuver includes releasing a brake.

17. The method of claim 10, wherein detecting the driver input includes detecting a direction of rotation of a steering wheel toward the adjacent lane and wherein preventing the steering maneuver includes actuating the steering wheel in a direction opposite the direction of rotation of the driver input.

18. The method of claim 10, wherein preventing the steering maneuver includes limiting a powertrain output to prevent the steering maneuver.

\* \* \* \* \*